United States Patent [19]

Noma et al.

[11] 4,045,327

[45] Aug. 30, 1977

[54] ELECTROPHORETIC MATRIX PANEL

[75] Inventors: Shinichi Noma, Katano; Nobumasa Ohshima, Hirakata, both of Japan

[73] Assignee: Matsushita Electric Industrial Co., Ltd., Japan

[21] Appl. No.: 607,902

[22] Filed: Aug. 26, 1975

[30] Foreign Application Priority Data

Aug. 28, 1974 Japan .................................. 49-99344
Aug. 29, 1974 Japan .................................. 49-99665

[51] Int. Cl.$^2$ .................. C25D 1/12; G03G 13/00
[52] U.S. Cl. .................. 204/299 R; 96/1 R; 96/1 PE; 204/180 R; 204/181; 355/5
[58] Field of Search .................. 204/180 R, 181, 299; 96/1.3, 1 PE, 1 R, 1 A, 1.2, 1.5, 1.7; 350/160 R; 313/518, 521; 355/3 R, 5, 4

[56] References Cited

U.S. PATENT DOCUMENTS

| | | | |
|---|---|---|---|
| 3,737,311 | 6/1973 | Wells | 96/1.3 X |
| 3,772,010 | 11/1973 | Weiss | 96/1.3 X |
| 3,804,620 | 4/1974 | Wells | 96/1.3 |
| 3,850,627 | 11/1974 | Wells et al. | 96/1.3 |
| 3,857,708 | 12/1974 | Verhille et al. | 96/1.7 X |
| 3,894,870 | 7/1975 | Kinoshita et al. | 96/1.5 |
| 3,928,036 | 12/1975 | Jones | 96/1.5 |
| 3,941,594 | 3/1976 | Honjo et al. | 96/1.5 X |

Primary Examiner—Arthur C. Prescott
Attorney, Agent, or Firm—Wenderoth, Lind & Ponack

[57] ABSTRACT

An electrophoretic matrix display panel is composed of a first insulating substrate having a first set of strip-shaped parallel electrodes thereon and a voltage non-linear resistive layer on the first set of parallel electrodes. Dot-shaped intermediate electrodes isolated from each other are positioned on the voltage non-linear resistive layer, and an electrophoretic suspension layer consisting of a suspending medium and at least one electrophoretic material suspended therein is placed over the intermediate electrodes and contained thereon by a frame. A second set of parallel electrodes extending in a direction transverse to the direction of the first set of electrodes is placed over the frame and the electrophoretic suspension layer, and a second insulating substrate is provided thereover. The two sets of parallel electrodes cross to define cross points at which the dot-shaped intermediate electrodes are positioned and which constitute picture elements of the matrix display panel.

4 Claims, 4 Drawing Figures

ELECTROPHORETIC MATRIX PANEL

This invention relates to an electrophoretic display panel, and more particularly relates to an electrophoretic display panel containing a voltage non-linear resistive layer having high resistance provided on an electrophoretic suspension layer.

The structure and principle of operation of an electrophoretic display panel are described in detail, for example, in U.S. Pat. No. 3,668,106 the assignee of which is the same as that of the present application. That is, the electrophoretic display panel comprises a cell formed by two opposed transparent insulating substrates which have transparent electrodes formed thereon, respectively and an electrophoretic suspension, which consists of fine particles of colored electrophoretic material suspended in a colored suspending medium, in said cell. When a D.C. voltage is applied to the cell, the particles are moved and deposited on one electrode according to the polarity of the electrophoretic material, and the thus formed image is observed by reflective light.

In a conventional electrophoretic display panel, the thickness of the electrophoretic suspension layer is usually about 40 to 150μ, and the panel is operated by D.C. voltage. The electrophoretic suspension layer has a very high resistance i.e., about $1 \times 10^{10}$ to $1 \times 10^{12} \Omega$ cm and has a capacitance of about 20 to 80 pF/cm$^2$. Further, the non-linear index $\alpha$ of the layer of the current (I) vs. voltage (V) characteristics ($I \propto V^\alpha$) is nearly one, and so the electrophoretic suspension layer itself does not have voltage non-linearity. Therefore, for a conventional electrophoretic display panel as disclosed in aforesaid U.S. Pat. No. 3,668,106, because a picture element which is not selected is displayed due to crosstalk, the contrast of the desired image is greatly decreased. Therefore, it is very difficult in practice to display an image by the conventional electrophoretic display panel.

In a conventional electroluminescent matrix display panel, it is well known that undesirable luminescence of the non-selected picture element caused by crosstalk can be suppressed by providing a voltage non-linear resistive layer in the electroluminescent layer and, consequently the contrast of a displayed image can be improved. However, because the resistance of such a voltage non-linear resistive layer, i.e. a layer having a non-linear current vs. voltage characteristic, is very low compared with the resistance of the electrophoretic suspension layer, it is difficult to provide a conventional voltage non-linear resistive layer in the electrophoretic display panel. Further, when SiC powder is used, for example, as a voltage non-linear resistive material, the SiC powder is mixed with the same amount or a less amount of resin binder, and the powder is rough, having an average grain-size larger than 5μ. Therefore, there is another disadvantage that degradation of image quality is inevitable.

Therefore, an object of the present invention is to provide a new and improved electrophoretic device for displaying and/or recording an image.

Another object of the invention is to provide an improved electrophoretic matrix display panel which can display an image without crosstalk by means of a voltage non-linear resistive layer.

A further object of the invention is to provide an electrophoretic device for displaying and/or recording a voltage with a structure of a panel corresponding to a single picture element of the aforesaid matrix display panel.

These objects are achieved by providing an electrophoretic matrix panel comprising a first insulating substrate having a first set of parallel strip-shaped electrodes thereon, a voltage non-linear resistive layer on said first set of parallel electrodes, dot-shaped intermediate electrodes isolated from each other and positioned on said voltage non-linear resistive layer, an electrophoretic suspension layer consisting of suspending medium and at least one electrophoretic material suspended in said suspending medium, a frame around the periphery of said panel, and a second insulating substrate having a second set of parallel strip shaped electrodes thereon; at least said second insulating substrate and said second set of parallel electrodes being transparent, said second insulating substrate being attached to said first insulating substrate through said frame so that said second set of parallel electrodes are transverse to said first set of parallel electrodes, and the crossing points of said first and second sets of parallel electrodes defining picture elements of said matrix display panel.

Other objects and the features of the invention will be apparent from consideration of the following description with accompanying the drawings in which.

Figure 1:
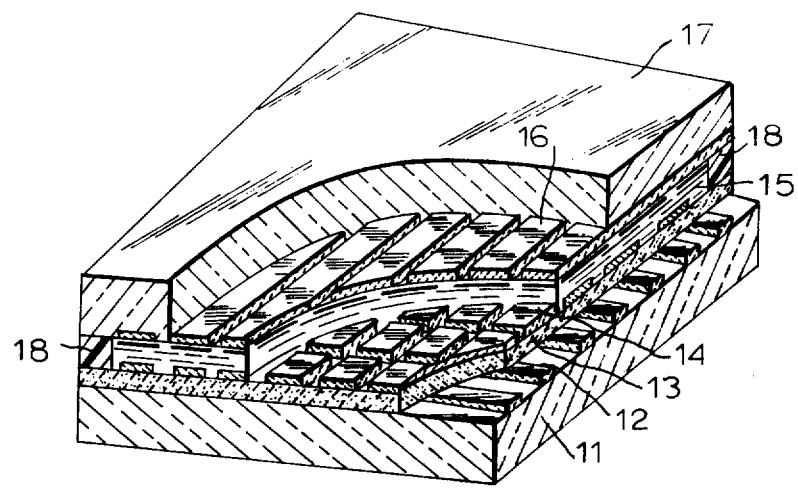
FIG. 1 is a schematic perspective view, partially broken away, of an electrophoretic matrix display panel according to the present invention.

Now, referring to FIG. 1, an electrophoretic matrix display panel of the invention comprises, from the bottom, a first insulating substrate designated by a reference numeral 11 having a first set of parallel strip-shaped electrodes 12 thereon, a high resistance voltage non-linear resistive layer 13 of powder of a voltage non-linear resistive material, such as SiC, ZnO or CdS, dispersed in a resin binder provided on said first set of parallel electrodes 12, dot-shaped intermediate electrodes 14 isolated from each other which are formed on said voltage non-linear resistive layer 13 by evaporation of metal such as aluminum, gold or copper, an electrophoretic suspension layer 15, and a second insulating substrate 17 having a second set of strip-shaped parallel electrodes 16 thereon. The second insulating substrate 17 is spaced from said first substrate a constant distance by a frame 18 so that the second set of electrodes are opposed to the intermediate electrodes 14 and the electrodes of the second set extend transversely of the electrodes of set of parallel electrodes 12. The electrophoretic suspension layer 15 is formed by pouring electrophoretic suspension liquid into the space within the frame 18 through an inlet provided at the periphery of the first or second insulating substrate, and thereafter the inlet is sealed.

Of the aforesaid insulating substrates 11 and 17, at least the second insulating substrate 17 at the display side of the device should be transparent such as a glass plate, and of the aforesaid parallel electrodes 12 and 16, at least the second set of parallel electrodes 16 on the transparent substrate 17 should be also transparent such as indium oxide or tin oxide. A picture element is defined by a crossing point of the parallel electrodes 12 and 16, and the dot-shaped intermediate electrodes 14, usually in the shape of a square, at the positions corresponding to each picture element. The frame 18 is made, for example, by of a plastic sheet or glass fibre. It is provided between the voltage non-linear resistive layer 13 and the second insulating substrate 17 or between the first and second insulating substrates 11 and 17 at the periphery of the panel so as to define the thickness of the electrophoretic suspension layer 15, and also so as to form, together with the two insulating substrates 11 and 17, the cell of the electrophoretic panel.

The electrophoretic suspension layer 15 consists of a suspending medium and fine particles of at least one kind of electrophoretic material suspended in the suspending medium. According to the polarity and amplitude of D.C. voltage applied to the selected picture elements (cross points) of the two sets of parallel electrodes 12 and 16, there is provided a display and/or recording of desired density and contrast. Moreover, by properly selecting the colors of the suspending medium and the electrophoretic material, it is possible to provide a color display and/or recording such as white and black, yellow and red, white and blue, etc.

The features of the present invention are the use of the non-linear resistive layer 13 having a high resistance by which impedance matching with the electrophoretic suspension layer 15 becomes possible, and the structure of the panel having the voltage non-linear resistive layer.

At first, for the structure of the voltage non-linear resistive layer 13 having a high resistance, the inventors have found that when fine SiC particles are used, for example, as the voltage non-linear resistive material, matching of the resistance component of the voltage non-linear resistance layer with the electrophoretic suspension layer becomes possible by increasing the amount of resin binder such as urea resin relative to the SiC particles, that is by arranging the ratio (weight ratio of solid constituents) of SiC particles and urea resin in the range from 2:3 to 2:10, and by making the thickness of the voltage non-linear resistive layer from 20 to 80μ.

Figure 2:
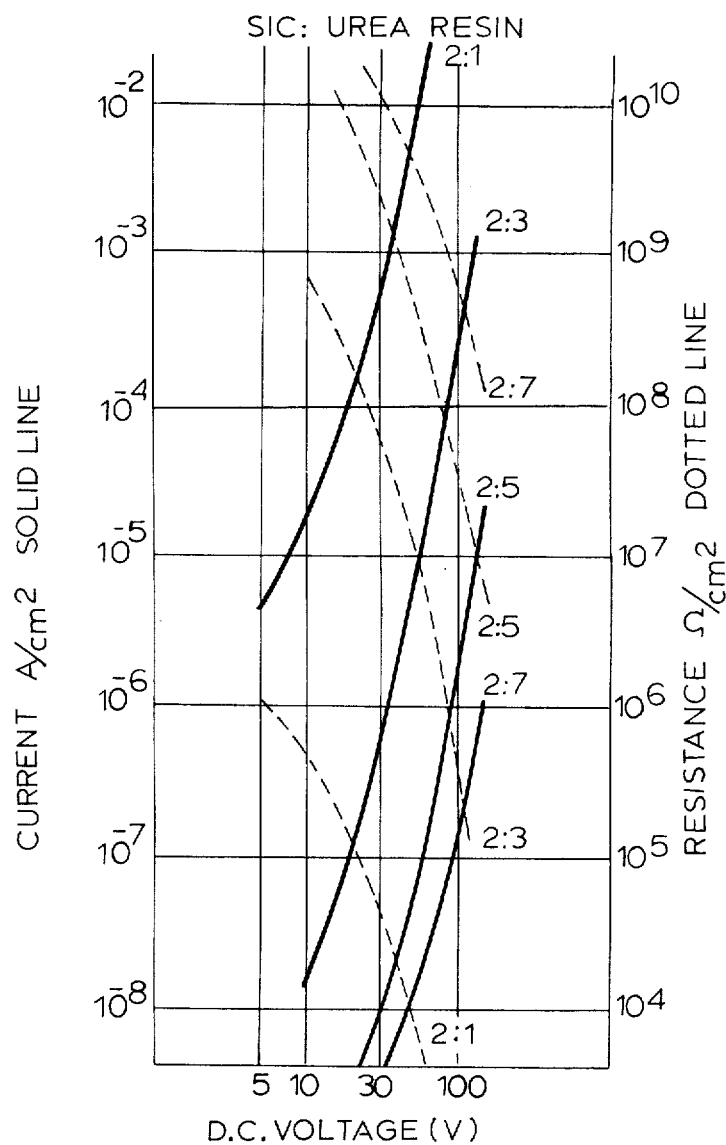
FIG. 2 is a graph showing an applied D.C. voltage vs. current and a resistance characteristics of a voltage non-linear resistance layer of the panel of the invention.

In experiments, fine SiC particles (No. 2000; made by Marumoto Kogyo Co., Japan) are mixed with urea resin (U-10S; made by Mitsui Toatsu Chemicals, Inc., Japan) in a weight ratio of solid constituents of 2:3 to 2:10, and a voltage non-linear resistive layer of high resistance is formed by a Silk Screen Method of having a thickness of about 30μ. FIG. 2 shows the characteristics of D.C. voltage vs. current and resistance of the resultant voltage non-linear resistive layers for various ratios within the above range. Such a voltage non-linear resistive layer has a high resistance suitable for lamination with the usual electrophoretic suspension layer and has a high voltage non-linear index ($\alpha \leq 5$). A high resistance voltage non-linear resistive layer formed by finer SiC particles (Black No. 4000; made by Fuji Kenmazai Kogyo Co., Japan) is also suitable for lamination with the usual electrophoretic suspension layer. The average grain size of SiC No. 2000 is about 5μ, and that of SiC No. 4000 is smaller than SiC No. 2000. In both the cases, because the particles are fine compared with those of the conventional voltage non-linear resistive layer, the resultant fine and uniform layer provides a better quality of the displayed image.

As described above, for the high resistance voltage non-linear resistive layer used for the electrophoretic matrix display panel, it is preferable that fine SiC particles having an average grain size smaller than 5μ are mixed with urea resin in the weight ratio of solid constituents from 2:3 to 2:10, and that the layer is formed with a thickness of 20 to 80μ, and the resultant voltage non-linear resistive layer have a high resistance and a high voltage non-linear index suitable for lamination with the electrophoretic suspension layer. However, under these conditions, the capacitance component of the voltage non-linear resistive layer 13 is 1 to 10 times that of electrophoretic suspension layer 15.

As the second features of the invention, there are provided the intermediate dot-shaped electrodes 14 on the non-linear resistive layer 13 at the crossing points of the parallel electrodes 12 and transverse parallel electrodes 17. Each of the dot-shaped intermediate electrodes is square, and the length of one side of the square is the same as the width of the electrodes of the second set of parallel electrodes 16 and the width of the electrodes of the first set of parallel electrodes 12 is from one to 1/10 the length of the other side of the square, so that matching of the capacitance component between the voltage non-linear resistive layer and the electrophoretic suspension layer becomes possible without a decrease of the voltage non-linear index of the voltage non-linear resistive layer. That is, when the width of the individual electrodes of the second parallel electrodes is A, the area of each intermediate electrode is AxB, and the width of the electrodes of the first parallel electrodes is C, the ratio of B and C should be from 1:1 to 10:1, and by such arrangement there is provided an electrophoretic matrix panel in which the impedance of the high resistance voltage non-linear resistive layer can be matched with that of the electrophoretic suspension layer. Therefore, display of the non-selected picture element due to crosstalk can be prevented and the contrast of the displayed image can be increased, and so it becomes possible to display and/or record a clear image.

With respect to impedance matching between the electrophoretic suspension layer and the voltage non-linear resistive layer, usually the electrophoretic suspension layer used in practice has a thickness of about 40 to 150μ, a resistance of about 10 to 1000 $\Omega \times /cm^2$ (1 × $10^{10}$ to (1 × $10^{12}\Omega$ cm) a capacitance of 20 to 80 pF/cm$^2$, as described hereinbefore. On the other hand, the voltage non-linear resistive layer has a thickness of 20 to 80μ when formed by mixing SiC fine particles and urea resin in a weight ratio of 2:3 to 2:10. The resistance of this voltage non-linear resistive layer is comparable to that of the electrophoretic suspension layer, and the capacitance of the voltage non-linear resistive layer becomes as shown in the following table for the various thickness thereof.

| Thickness of the voltage non-linear resistive layer | Capacitance of the non-linear resistive layer |
|---|---|
| 20 | 300~370 pF/cm$^2$ |
| 30 | 200~250 |
| 60 | 100~125 |
| 80 | 75~90 |

As can be understood from the table, the ratio of the capacitance of the voltage non-linear resistive layer to that of the electrophoretic suspension layer ranges from about 1:1 to 15:1. Therefore, impedance matching of these two layers is possible by making the size of one side of the intermediate dot electrode the same as the width of the electrodes of the second parallel electrodes and having the other side from 1 to 15 times the width of the electrodes of the first parallel electrodes. However, from the standpoint of dimensional accuracy of a practical panel structure, the aforesaid range of the other size of the intermediate dot electrode is 1 to 10 times the width of the electrodes of the first parallel electrodes. As the desirable thickness of the voltage non-linear resistive layer is about 30$\mu$ (200~250pF/cm$^2$) from the standpoint of forming the layer, when the thickness of the electrophoretic suspension layer is about 70$\mu$ (~40pF/cm$^2$), the desirable width of the other side of the intermediate dot electrode is about 4 to 6 times the width of the electrodes of the first parallel electrodes.

Figure 3:
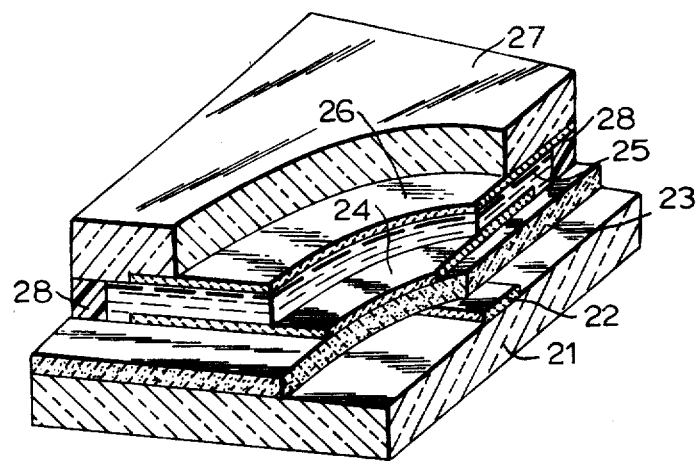
FIG. 3 is a schematic perspective view, partially broken away, of an electrophoretic display panel of a single picture element according to the invention.

FIG. 3 shows, as another embodiment of the present invention, an electrophoretic display panel corresponding to single picture element of the matrix panel of FIG. 1. In FIG. 3, the single picture element display panel comprises, from the bottom, a first insulating substrate 21 having a first strip shaped electrode 22 thereon, a high resistance voltage non-linear resistive layer 23, an intermediate electrode 24, an electrophoretic suspension layer 25, a second insulating substrate 27 having 25 second strip shaped electrode 26, and a frame 28. As is obvious from the description of the matrix panel shown in FIG. 1, in this single picture element display panel, when a voltage is applied to the electrophoretic suspension layer 25 which is lower than a certain threshold value, no display and/or recording is produced, while when a voltage above that threshold value is applied to the electrophoretic suspension layer a display and/or recording is provided. Therefore, such a panel can be used, for example, as a kind of voltmeter.

Now, an embodiment of the present invention will be further described in the following examples.

EXAMPLE 1

An electrophoretic matrix display panel as shown in FIG. 1 was made as follows. A thin layer of indium oxide was formed on the glass plate 11 of 100 × 100 mm$^2$, and by etching the formed layer the transparent parallel electrodes 12 (the first electrodes) were formed as seven strips 2 mm in width and with a 9 mm electrode gap therebetween. Then, five SiC particles (No. 4000; Fuji Kenmazai Kogyo Co., Japan) were mixed with urea resin (U-10S; Mitsui Toatsu Chemicals, Inc., Japan) in a weight ratio of the solid constituents of 2:5, and by painting the resultant paint through a silk screen onto the glass plate 11, the high resistance voltage non-linear resistive layer 13 was formed with a thickness of about 30$\mu$. Then, aluminum was evaporated on the voltage non-linear resistive layer 13 at the positions corresponding to the picture elements and each having an area of 10 ×10 mm$^2$ so as to form the dot shaped intermediate electrodes 14. On the other hand, a thin layer of indium oxide was formed on the other glass plate 17, and by etching the formed layer the transparent parallel electrodes 16 (the second electrodes) were formed as seven strips 10 mm in width and with 1 mm gap therebetween. Then, the glass plate 17 was attached to the former glass plate 11 through the frame 18 with epoxy resin adhesive so that the second electrodes 16 crossed the first electrodes 12 and overlapped the intermediate electrodes 14. The frame 18 was glass fibre 70$\mu$ in diameter and it was put on the voltage non-linear resistive layer 13 at the periphery of the panel.

The electrophoretic suspension layer 15 was composed of a suspension consisting of colored suspending medium and colored electrophoretic material. The suspending medium was a mixture of dibromotetrafluoroethane, olive oil, dyes and a few additives, and it was black in color. For the colored electrophoretic material, fine particles of titanium dioxide (white color) were used, and the surfaces of the particles were coated with phenol resin so as to adjust the specific gravity thereof to that of the suspending medium. The suspension was poured into an inlet provided at the periphery of the glass plate 11 or 17, and after pouring the inlet was sealed.

By using the thus completed panel, patterns of numerals and letters were displayed by a scanning method in which 60 to 75 volts was applied to the selected picture elements and 20 to 25 volts was applied to the selected picture elements due to crosstalk. By using non-fine SiC particles (No. 2000), it was also that it was possible by the same method to provide a matrix display.

For the single picture element (10 × 10 mm$^2$) of the above matrix panel, the electrophoretic suspension layer had a resistance of about 500 M$\Omega$, a non-linear index $\alpha$ of about one and a capacitance of about 40 pF. On the other hand, the voltage non-linear resistive layer (using the SiC particles No. 4000) had a similar resistance of about 500 M$\Omega$ at 50 volts D.C. and a voltage non-linear index $\alpha$ of 5 to 6, and the capacitance thereof could be adjusted so as to be nearly equal to that of the electrophoretic suspension layer by making the width of the first electrodes 2 mm, that is one fifth of 10 mm of the width of the intermediate dot shaped electrodes, as described hereinbefore.

EXAMPLE 2

An electrophoretic display panel which was a single picture element as shown in FIG. 3 was made as follows. A thin layer of indium oxide was formed on the glass plate 21 of 50 × 50 mm$^2$, and by etching formed layer the transparent electrode 22 of 4 mm in width and 50 mm long was formed. Then, using the same materials and by the same method as in Example 1, the high resistance voltage non-linear resistive layer 23 was formed having a thickness of about 30$\mu$. Then, by evaporating aluminum in an area of 20 × 20 mm$^2$ on the voltage non-linear resistive layer, the intermediate electrode 24 was formed. On the other hand, a thin layer of indium oxide was formed on the other glass plate 27, and by etching the formed layer a transparent electrode 26 which was 20 mm in width and 50 mm in length was formed. Then, the glass plate 27 was attached to glass plate 21 through the frame 28 with epoxy resin adhesive so that the electrode 26 crossed the electrode 22 and overlapped the intermediate electrode 24. The frame 28 was glass fibre 70$\mu$ in diameter and it was put on the voltage non-linear resistive layer at the periphery of the panel. The electrophoretic suspension layer 25 was formed similarly to that of Example 1 with the same suspension as that of the Example 1.

Figure 4:
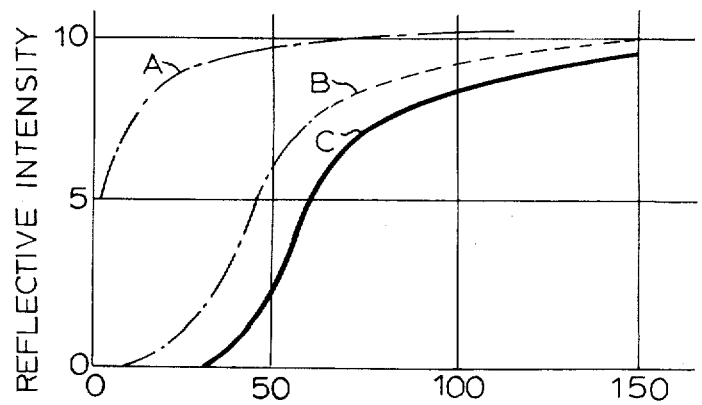
FIG. 4 is a graph showing an applied D.C. voltage vs. reflective intensity characteristic of a panel of FIG. 3 in comparison with that of a conventional panel.

The thus made panel is designated as panel A, and there was made another panel B having the same structure in which the voltage non-linear resistive layer was formed with finer SiC particles (No. 4000) instead of the particles (No. 2000) of panel A. Further, there was made another panel C, for comparison, which did not have the voltage non-linear resistive layer. In the panel C, the electrodes 22 and 26 had the same width of 20 mm. FIG. 4 shows the D.C. voltage vs. reflective strength characteristics of these three panels.

It will be understood from FIG. 4 that the rising voltage (threshold value) of the panel C having no voltage non-linear resistive layer is as low as several volts, but those of the panels A and B are high such as 10 to 25 volts. Thus is, the effect of the high resistance voltage non-linear resistive layer can be understood. In the panels A and B, for a voltage lower than these threshold voltages, insufficient voltage for producing a display is provided to the electrophoretic suspension layer. Above the threshold voltage, display and/or recording of the panel becomes possible, and so the panel can be used as a kind of voltmeter.

The characteristics of FIG. 4, that is the threshold voltage of the panel, can be changed within a certain range by varying the mixing ratio of the fine SiC particles and binder of urea resin within the range of 2:3 to 2:10 and by varying the composition of the electrophoretic suspension. The preferred grain size of the voltage non-linear resistive material and the preferred conditions for forming the voltage non-linear resistive layer such as the thickness and the painting method are selected according to the relation with the electrophoretic suspension layer laminated thereon, and so they can not chosen arbitrarily. It is clear that the subject matter of the present invention can be applied to a display panel using any kind of electrophoretic suspension layer.

What is claimed is:

1. An electrophoretic matrix display panel comprising a first insulating substrate having a first set of strip-shaped parallel electrodes thereon, a voltage non-linear resistive layer on said first set of parallel electrodes, said non-linear resistive layer being SiC particles having an average grain size smaller than $5\mu$ in urea resin, said SiC particles and urea resin being mixed in a weight ratio of from 2:3 to 2:10, dot-shaped intermediate electrodes isolated from each other and positioned on said voltage non-linear resistive layer, an electrophoretic suspension layer consisting of suspending medium and at least one electrophoretic material suspended in said suspending medium, a frame around the periphery of said panel, and a second insulating substrate having a second set of strip-shaped parallel electrodes thereon; at least said second insulating substrate and said second insulating substrate being attached to said first insulating substrate through said frame and said second set of parallel electrodes extending in a direction transverse to the direction of said first set of parallel electrodes and crossing said first set of parallel electrodes to define cross points between the respective elements of the sets of electrodes the cross points between said first and second sets of parallel electrodes constituting picture elements of said matrix display panel, said dot-shaped intermediate electrodes being positioned at the cross points between said first and second sets of parallel electrodes.

2. An electrophoretic matrix display panel as claimed in claim 1, wherein said intermediate electrodes are square.

3. An electrophoretic matrix display panel as claimed in claim 2, wherein said intermediate electrodes each have one side the length of which is the same as the width of the electrodes of said second set of parallel electrodes and the other side the length of which is 1 to 10 times the width of the electrodes of said first set of parallel electrodes.

4. An electrophoretic display panel comprising a first insulating substrate having a first electrode thereon, a voltage non-linear resistive layer on said first electrode, said non-linear resistive layer being SiC particles having an average grain size smaller than $5\mu$ in urea resin, said SiC particles and urea resin being mixed in a weight ratio of from 2:3 to 2:10, an intermediate electrode on said voltage non-linear resistive layer, an electrophoretic suspension layer consisting of suspending medium and at least one electrophoretic material suspended in said suspending medium, a frame around the periphery of said panel, and a second insulating substrate having a second electrode thereon; at least said second insulating substrate and said second electrode being transparent, and said second insulating substrate being attached to said first insulating substrate through said frame with said second electrode crossing said first electrode and overlapping said intermediate electrode.

* * * * *